United States Patent
Zhang et al.

(10) Patent No.: US 11,242,756 B2
(45) Date of Patent: Feb. 8, 2022

(54) DAMPING COATING WITH A CONSTRAINT LAYER

(71) Applicant: General Electric Company, Schenectady, NY (US)

(72) Inventors: James Zhang, Simpsonville, SC (US); John McConnell Delvaux, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 61 days.

(21) Appl. No.: 16/865,999

(22) Filed: May 4, 2020

(65) Prior Publication Data

US 2021/0340874 A1 Nov. 4, 2021

(51) Int. Cl.
*F01D 5/16* (2006.01)
*B32B 9/04* (2006.01)
*F01D 5/22* (2006.01)

(52) U.S. Cl.
CPC ............... *F01D 5/16* (2013.01); *B32B 9/041* (2013.01); *F01D 5/225* (2013.01); *B32B 2307/51* (2013.01); *B32B 2603/00* (2013.01); *F05D 2220/32* (2013.01); *F05D 2240/307* (2013.01); *F05D 2260/96* (2013.01)

(58) Field of Classification Search
CPC ... F01D 5/14; F01D 5/147; F01D 5/16; F01D 5/22; F01D 5/225; F01D 5/288; F05D 2260/96; B32B 3/26; B32B 3/30; B32B 2603/00
See application file for complete search history.

(56) References Cited

U.S. PATENT DOCUMENTS 3,301,530 A * 1/1967 Lull .................. C23C 28/02
                                                         416/241 R
3,758,233 A    9/1973 Cross et al.
(Continued)

FOREIGN PATENT DOCUMENTS

EP    0077987 A1    5/1983
GB    2391270 A     2/2004
(Continued)

OTHER PUBLICATIONS

David, E. and Jackson, I. High-temperature internal friction and dynamic moduli in copper. Materials Science and Engineering A. May 28, 2018. https://doi.org/10.1016/j.msea.2018.05.093 (Year: 2018).*

(Continued)

*Primary Examiner* — Topaz L. Elliott
(74) *Attorney, Agent, or Firm* — Charlotte Wilson; Hoffman Warnick LLC

(57) ABSTRACT

A coating is applied to a base material. The coating comprises a viscoelastic layer having a surface in which cavities are formed; and a constraint layer. The viscoelastic layer is disposed on the base material, and the constraint layer is disposed on, and partially bonded, at an interface, to the viscoelastic layer over the surface in which the cavities are formed. The cavities are filled with particles configured for vibration and frictional interaction at the partially bonded interface between the partially bonded viscoelastic layer and the constraint layer. A turbine blade having an airfoil with the subject coating is also provided.

11 Claims, 6 Drawing Sheets

(56) References Cited

U.S. PATENT DOCUMENTS

| | | | |
|---|---|---|---|
| 5,118,562 A * | 6/1992 | Johnson | B32B 25/08 |
| | | | 428/327 |
| 5,215,442 A | 6/1993 | Steckle et al. | |
| 5,271,142 A * | 12/1993 | Moore, III | B21D 22/205 |
| | | | 29/469.5 |
| 5,474,840 A * | 12/1995 | Landin | B32B 17/10743 |
| | | | 428/450 |
| 5,842,686 A * | 12/1998 | Hansen | F16F 9/306 |
| | | | 267/140 |
| 6,171,058 B1 | 1/2001 | Stec | |
| 6,299,410 B1 * | 10/2001 | Hilbert | F16F 15/005 |
| | | | 416/145 |
| 6,676,380 B2 | 1/2004 | Davis et al. | |
| 6,827,551 B1 | 12/2004 | Duffy et al. | |
| 7,296,977 B2 | 11/2007 | Bonnet | |
| 7,311,500 B2 | 12/2007 | Rongong et al. | |
| 8,061,997 B2 * | 11/2011 | Le Hong | F01D 5/147 |
| | | | 416/230 |
| 8,591,196 B2 | 11/2013 | Hardwicke | |
| 10,344,772 B2 * | 7/2019 | Roche | B23P 15/04 |
| 2005/0094311 A1 * | 5/2005 | Boss | G11B 25/043 |
| | | | 360/97.19 |
| 2006/0040096 A1 | 2/2006 | Eadara et al. | |
| 2007/0081894 A1 | 4/2007 | Garner | |
| 2007/0081901 A1 | 4/2007 | Wagner et al. | |
| 2008/0236739 A1 * | 10/2008 | Ashley | B32B 15/14 |
| | | | 156/285 |
| 2009/0053068 A1 * | 2/2009 | Hardwicke | F01D 25/06 |
| | | | 416/241 R |
| 2010/0206662 A1 * | 8/2010 | Mitsuoka | B32B 15/18 |
| | | | 181/207 |
| 2010/0261023 A1 * | 10/2010 | Ravnaas | E04B 1/86 |
| | | | 428/448 |
| 2011/0081249 A1 * | 4/2011 | Read | F01D 5/147 |
| | | | 416/233 |
| 2014/0079529 A1 | 3/2014 | Kareff et al. | |
| 2014/0255207 A1 | 9/2014 | Boyer | |
| 2015/0361825 A1 * | 12/2015 | Amini | F01D 5/288 |
| | | | 415/119 |
| 2017/0067348 A1 | 3/2017 | Kareff et al. | |
| 2018/0216469 A1 * | 8/2018 | Hoskin | F01D 5/26 |
| 2021/0229400 A1 * | 7/2021 | Milliman | B32B 15/088 |

FOREIGN PATENT DOCUMENTS

| | | | | |
|---|---|---|---|---|
| JP | 2012180764 A | * | 9/2012 | |
| WO | WO2014100528 A1 | | 6/2014 | |
| WO | WO-2014196987 A2 | * | 12/2014 | F04D 29/023 |
| WO | WO2015105545 A2 | | 7/2015 | |
| WO | WO-2018057570 A1 | * | 3/2018 | B32B 25/18 |

OTHER PUBLICATIONS

European Patent Office, European Search Report for corresponding EP Application No. 21158839.7, dated Aug. 13, 2021.

* cited by examiner

DAMPING COATING WITH A CONSTRAINT LAYER

This invention was made with government support under contract number DE-FE0031613 awarded by the U.S. Department of Energy. The government has certain rights in the invention.

BACKGROUND

The disclosure relates generally to a damping coating applied to a turbine component, such as but not limited to a blade, either with or without part span shrouds, to provide beneficial damping effects. More particularly, this disclosure relates generally to a damping coating applied to a turbine component with the damping coating including a viscoelastic and a constraint layer.

Turbine and compressor sections within an axial flow turbine engine generally include a rotor assembly comprising a rotating disk and a plurality of blades circumferentially disposed around the disk. Each blade can include a root, an airfoil, and a platform positioned in the transition area between the root and the airfoil. The roots of the blades are received in complementary shaped recesses within the disk. The platforms of the blades extend laterally outward and collectively form a flow path for fluid passing through the rotor stage. The forward edge of each blade is generally referred to as the leading edge and the aft edge as the trailing edge. Forward is defined as being upstream of aft in the gas flow through the engine.

During operation, blades may be excited into vibration by a number of different forcing functions. Variations in gas temperature, pressure, and/or density, for example, can excite vibrations throughout the rotor assembly, especially within the blade airfoils. Gas exiting upstream of the turbine and/or compressor sections in a periodic, or "pulsating" manner can also excite undesirable vibrations.

One concern in turbine operation is the tendency of the turbine blades to undergo vibrational stress during operation. In many installations, turbines are operated under conditions of frequent acceleration and deceleration. During acceleration or deceleration of the turbine, the blades are, momentarily at least, subjected to vibrational stresses at certain frequencies and in many cases to vibrational stresses at secondary or tertiary frequencies. When a blade is subjected to vibrational stress, its amplitude of vibration can readily build up to a point which may alter operations.

BRIEF DESCRIPTION

A first aspect of the disclosure provides a coating on a base material, the coating including a viscoelastic layer and a constraint layer. The viscoelastic layer is disposed on the base material and the constraint layer is disposed on the viscoelastic layer.

A second aspect of the disclosure provides a turbine blade with a coating on a base material, the turbine blade defining the base material. The coating includes a viscoelastic layer and a constraint layer. The viscoelastic layer is disposed on the base material and the constraint layer is disposed on the viscoelastic layer.

A third aspect of the disclosure provides a gas turbine system, the gas turbine system comprising a turbine blade, the turbine blade including a base material and a coating on the base material. The coating includes a viscoelastic layer and a constraint layer. The viscoelastic layer is disposed on the base material and the constraint layer is disposed on the viscoelastic layer, wherein the viscoelastic layer and the constraint layer join at an interface therebetween. The viscoelastic layer is partially bonded to the constraint layer. Defects are formed at the interface partially bonding the viscoelastic layer to the constraint layer, the defects enabling vibration and frictional and impact interaction at the partially bonded interface between the partially bonded viscoelastic layer and the constraint layer.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
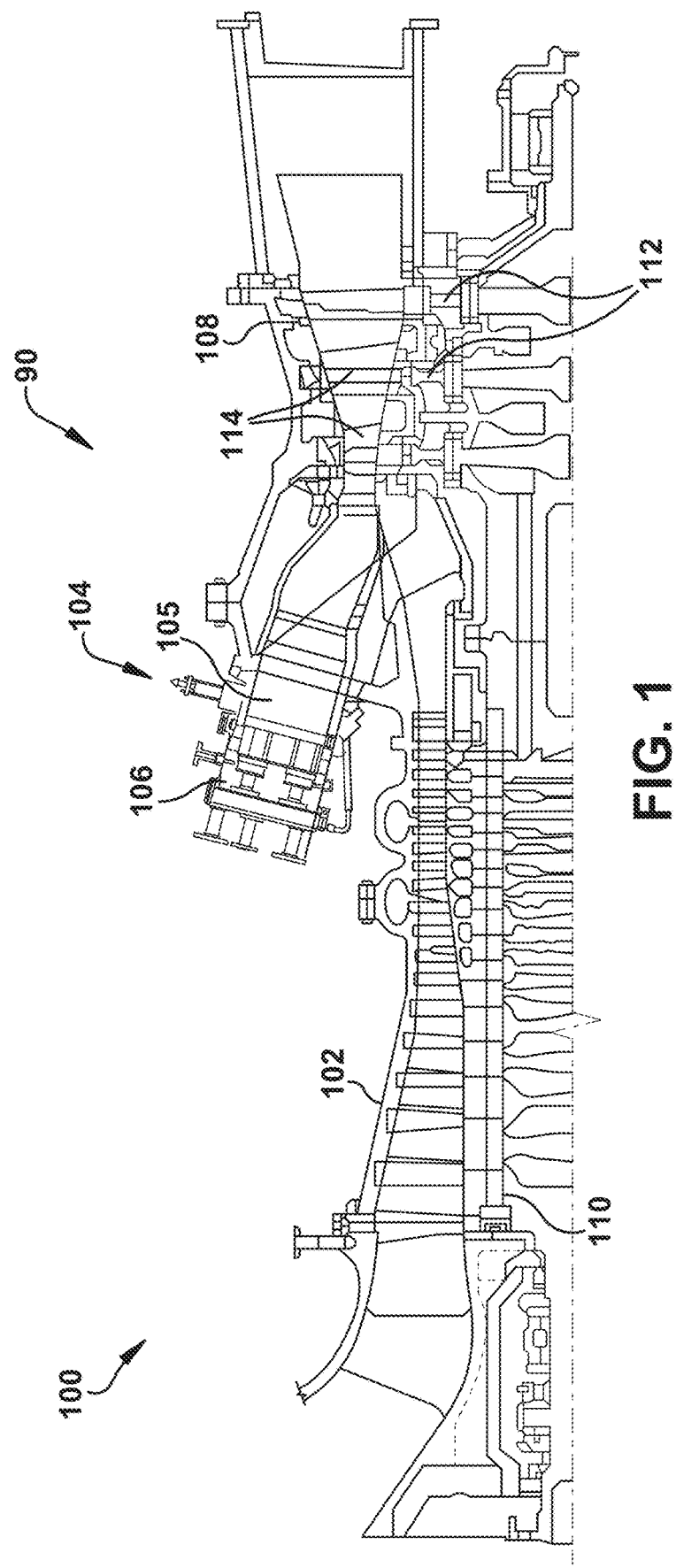
FIG. 1 illustrates a gas turbine engine with locations where blades of the instant embodiments may be employed.

As an initial matter, in order to clearly describe the current technology it will become necessary to select certain terminology when referring to and describing relevant machine components within turbine engines. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

In a combustion turbine engine, air pressurized in a compressor is used to combust a fuel in a combustor to generate a flow of hot combustion gases, whereupon such gases flow downstream through one or more turbines so that energy can be extracted therefrom. In accordance with such a turbine, generally, rows of circumferentially spaced blades extend radially outwardly from a supporting rotor disc. Each blade typically includes a blade root, e.g., a dovetail, which permits assembly and disassembly of the blade in a corresponding slot in the rotor disc, as well as an airfoil that extends radially outwardly from the blade mount and interacts with the flow of the working fluid through the engine. The airfoil has a concave pressure side and convex suction side extending axially between corresponding leading and trailing edges, and radially between a root and a tip. It will be understood that the blade tip is spaced closely to a radially outer stationary surface for reducing leakage therebetween of the combustion gases flowing downstream between the turbine blades.

Shrouds at the tip of the airfoil or "tip shrouds" on aft stage blades provide a point of contact at the tip, manage bucket frequencies, enable a damping source (i.e., by connecting the tips of neighboring rotor blades), and reduce the over-tip leakage of the working fluid. Given the length of the blades in the aft stages, the damping function of the tip shrouds provides a significant benefit to durability. However, taking full advantage of the benefits is difficult considering the weight that the tip shroud adds to the assembly and the other configuration criteria, which include enduring hours of operation exposed to high temperatures and extreme mechanical loads. Thus, while large tip shrouds are desirable because of the effective manner in which they seal the gas path and robust connection they may form between neighboring blades, large tip shrouds may not be ideal because of the increased pull loads on the disc, particularly at the base of the airfoil because it must support the entire load of blade.

Another consideration is that the output and efficiency of gas turbine engines improve as the size of the engine and, and more specifically, the amount of air able to pass through it increase. The size of the engine, however, may be limited by the operable length of the turbine blades, with longer turbine blades enabling enlargement of the flow path through the engine. Longer blades, though, incur increased mechanical loads, which may place further demands on the blades and the disc that holds them. Longer blades also decrease natural vibrational frequencies of blades during operation, which increases the vibratory response of the blades. This additional vibratory load places even greater demands on blade configuration, which may limit component life and, in some cases, may cause vibratory loads in the turbine engine. Another way, other than damping, to address the vibratory load of longer blades is through the use of shrouds that connect adjacent blades to each other.

One way to modify a blade in light of loads thereon is to position a shroud lower on the airfoil of the blade, i.e., at a position that is closer to the middle or base of the blade. Instead of adding the shroud to the tip of the blade, the shroud may be positioned near the middle radial portion of the airfoil. As used herein, such a shroud will be referred to as a "part-span shroud." At this lower (or more inboard) radius, the mass of the shroud causes a reduced level of stress to the blade root. This type of part-span shroud may leave a portion of the airfoil of the blade unrestrained (i.e., that portion of the airfoil that extends outboard of the part-span shroud towards the tip). This portion of the airfoil is cantilevered and can result in lower frequency vibration and increased vibratory loads. Accordingly, reducing or limiting loads in a blade may increase life of a blade and associated systems.

With reference to FIG. 1, a turbomachine 90 in the form of a combustion turbine or gas turbine (GT) system 100 (hereinafter 'GT system 100') is illustrated. GT system 100 includes a compressor 102 and a combustor 104. Combustor 104 includes a combustion region 105 and a fuel nozzle assembly 106. GT system 100 also includes a turbine 108 and a common compressor/turbine shaft 110 (hereinafter referred to as 'rotor 110'). In one embodiment, GT system 100 is a 7HA.03 engine, commercially available from General Electric Company, Boston, Mass. A set of stationary vanes or nozzles 112 cooperate with a set of rotating blades 114 to form each stage of turbine 108, and to define a portion of a flow path through turbine 108.

Figure 2:
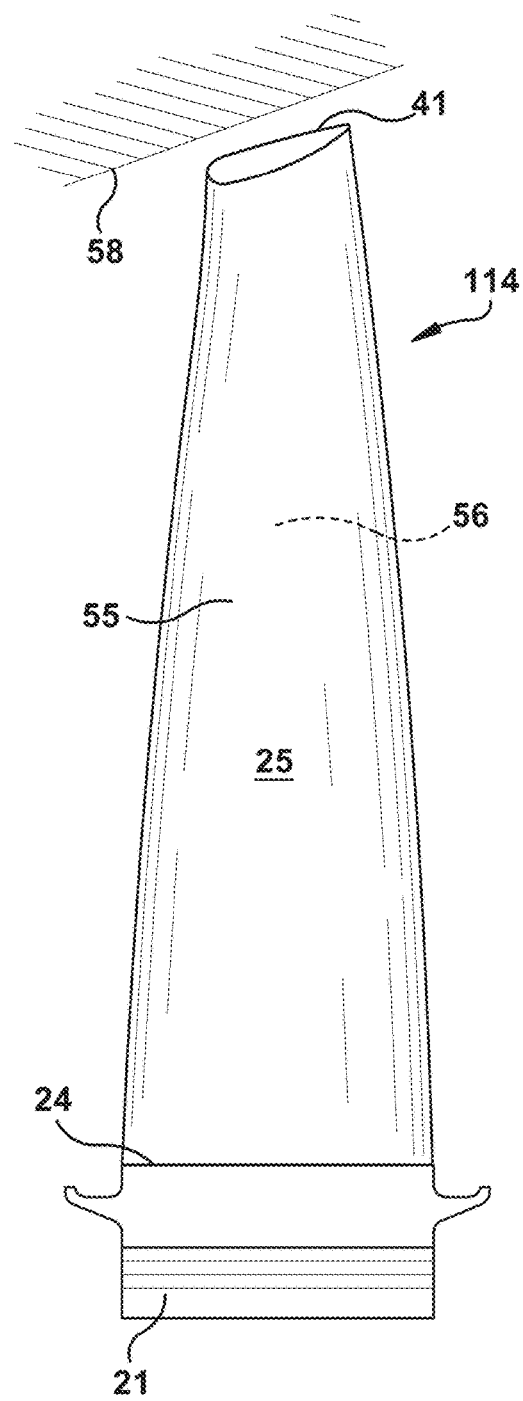
FIG. 2 illustrates an illustrative blade in accordance with aspects of the disclosure.

FIG. 2 illustrates aspects of the present embodiments. As illustrated in FIG. 2, the present embodiments provide a blade 114 with an airfoil 25 having a part-span shroud 53. The airfoil 25 extends from a root 21, where the platform 24 is essentially a planar platform with a fillet 26 (best illustrated in FIG. 7) transitioning from the base 21 to the airfoil 25, and includes a pressure side surface 55 of the airfoil and a suction side surface face 56 of the airfoil (opposite side of the airfoil 25 in FIG. 2).

Figure 3:
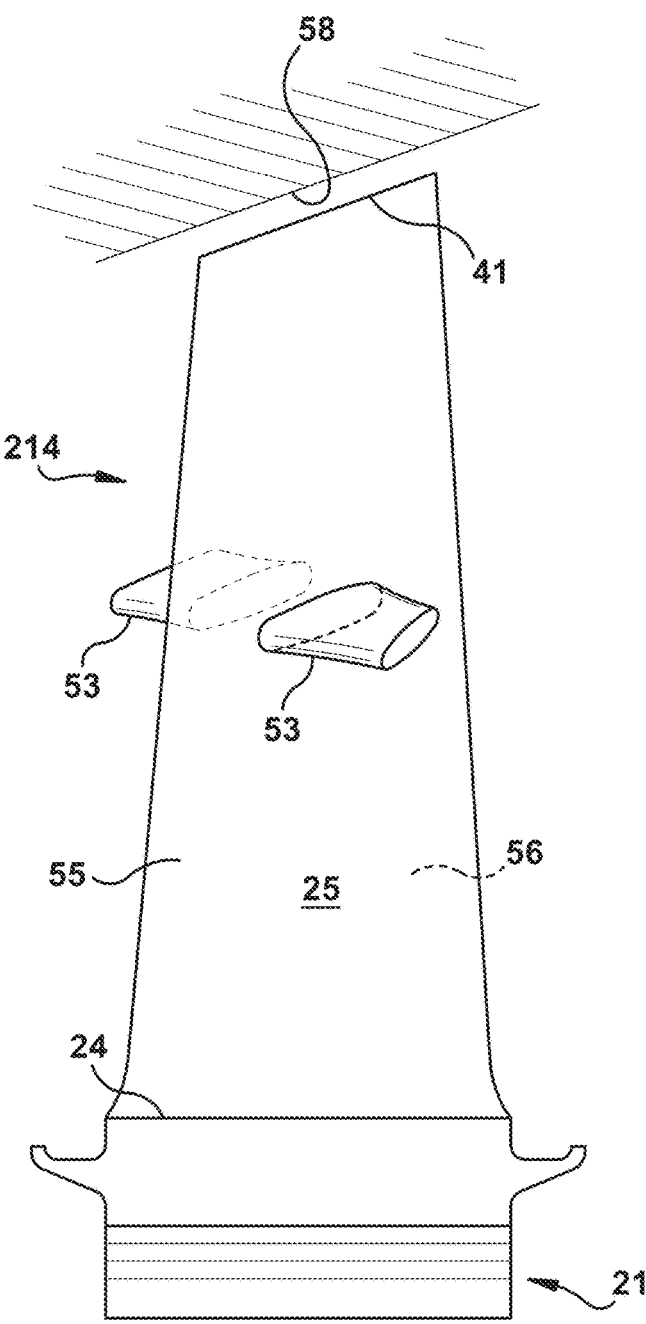
FIG. 3 illustrates an illustrative blade with part-span shrouds in accordance with aspects of the disclosure.

FIG. 3 illustrates further aspects of the present embodiments Like parts are indicated with similar reference numbers. As illustrated in FIG. 3, the present embodiments describe a blade 214 with an airfoil 25 having a part-span shroud 53. The part-span shroud 53 are capable of linking and/or connecting to adjacent blades at complementary adjacent part-span shroud structures on those adjacent blades. Benefits of this part-span shroud 53 arrangement are several, including an overall reduced tip mass as some of that mass is relocated closer to the axis of rotation, which reduces mechanical loads and mechanical stress of the blade root. Also, the part-span shroud configuration, as embodied herein, can provide a reduced turbulent flow to reduce mechanical stress, shock (or balance any shock in the turbine system 100), vibrations, all of which can decrease operational output and efficiency of the turbine system 100. Therefore, each part span shroud 53 respectively, can enhance efficiency of the turbine system 100.

Additionally, the reduction in mechanical loads and stress, and blade vibration as a result of part span shroud configuration, as embodied herein, can reduce initial gap clearance between the blade at the tip 41 and its adjacent stationary structure 58 because the airfoil 25 should experience less elongation during operation. The reduced mechanical elongation pull on the blade 214 may also prolong blade life.

As noted above, longer blades, though, incur increased mechanical loads, which may place further demands on the blades and the disc that holds them. Longer blades also decrease natural vibrational frequencies of blades during operation, which increases the vibratory response of the blades. This additional vibratory load places even greater demands on blade configuration, which may limit component life and, in some cases, may cause vibratory loads in the turbine engine. Even if provided with part-span shroud configurations, vibratory loads may still be encountered, including above the part-span shroud configurations away from the base of the airfoil.

Accordingly, the present disclosure is directed to a layered damping coating applied to a blade, where the blade either includes or does not include part-span shrouds, to provide beneficial damping effects. Additional mass of the layered damping coating may inhibit vibrations on structures during operation of a machine, and thus a layered damping coating on a blade may inhibit vibrations, and damp the blade.

Therefore, the disclosure provides a layered "sandwich structure" damping coating 70 (hereinafter "layered coating") that damps a turbine blade, where the turbine blade forms a base material of the layered damping coating. Layered coating 70, as embodied by the disclosure, can be applied to the entirely of airfoil 25 (e.g., at least on suction and pressure sides 55, 56, which will be the application of layered coating 70 herein unless otherwise disclosed) of turbine blade 214 with part-span shrouds 53, or applied to an airfoil 25 of turbine blade 114 that does not include part-span shrouds, as described hereinafter. Moreover, the layered coating 70, as embodied by the disclosure, can be applied to substantially an entire airfoil 25 of a turbine blade 214 with part-span shrouds 53 or applied only to portions of a turbine blade 114 that does not include part-span shrouds.

Figure 4:
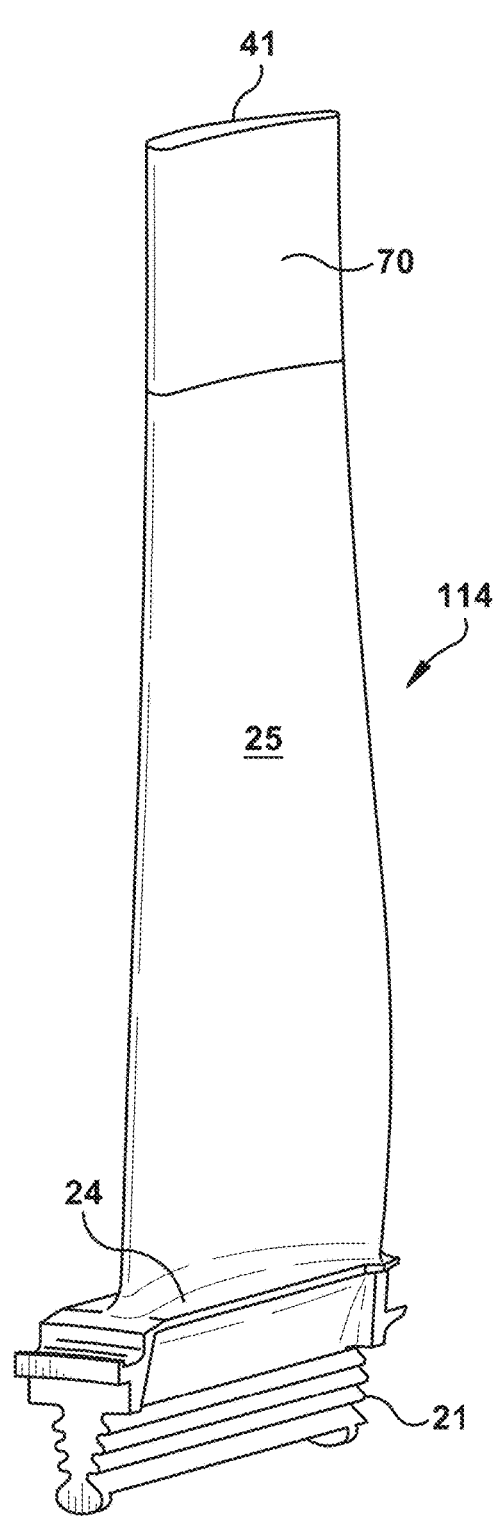
FIG. 4 illustrates an illustrative blade with a partial damping coating in accordance with aspects of the disclosure.

With reference to FIG. 4, a layered coating 70, as embodied by the disclosure, is applied to a turbine blade 114 that does not include part-span shrouds. As illustrated, the layered coating 70 extends from tip 41 over only an upper portion of airfoil 25 of blade 114. While layered coating 70 is illustrated as only applied to airfoil 25 at an upper portion, aspects of the embodiment include the layered coating 70 applied to airfoil 25 from tip 41 to any part of airfoil 25 and blade 114 extending to the platform 24. Alternatively, layered coating 70 can extend the entire length of airfoil 25 of blade 114 (see FIG. 7 described below).

Figure 5:
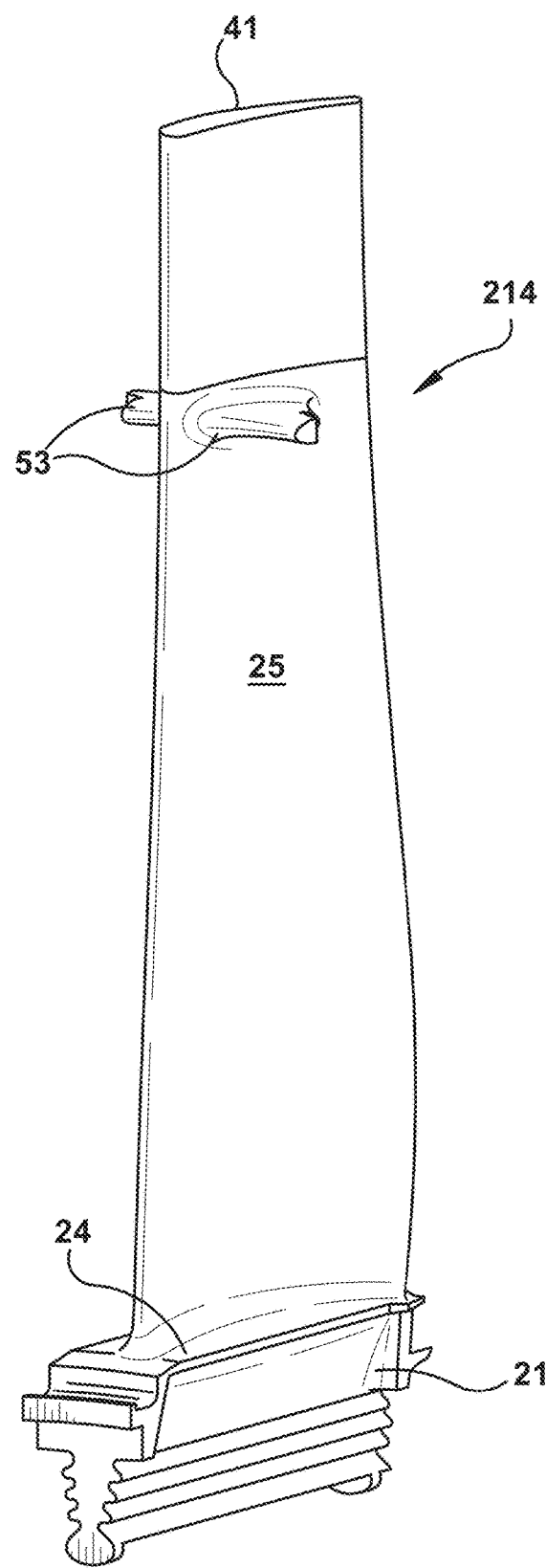
FIG. 5 illustrates an illustrative blade with part-span shrouds with a partial damping coating in accordance with aspects of the disclosure.

Moreover, as illustrated in FIG. 5, layered coating 70 can be applied to airfoil 25 of blade 214 that includes part span shrouds 53. In FIG. 5, layered coating 70 is applied from tip 41 to airfoil 25 stopping before part span shrouds 53. However, this extent of layered coating 70 on airfoil 25 from tip 41 to the part span shrouds 53 is merely illustrative and not intended to limit the embodiments in any manner. Layered coating 70 can extend from tip 41 on the airfoil 25 stopping before the part span shrouds 53 (as illustrated) or conversely layered coating 70 can extend past the part span shrouds 53 on the airfoil 25 towards the platform 24 (see FIG. 8 described below). Additionally, layered coating 70 can be optionally applied from tip 41 and coated on part span shrouds 53 to provide damping effect at those locations, if layered coating 70 extends past the part span shrouds 53.

Figure 6:
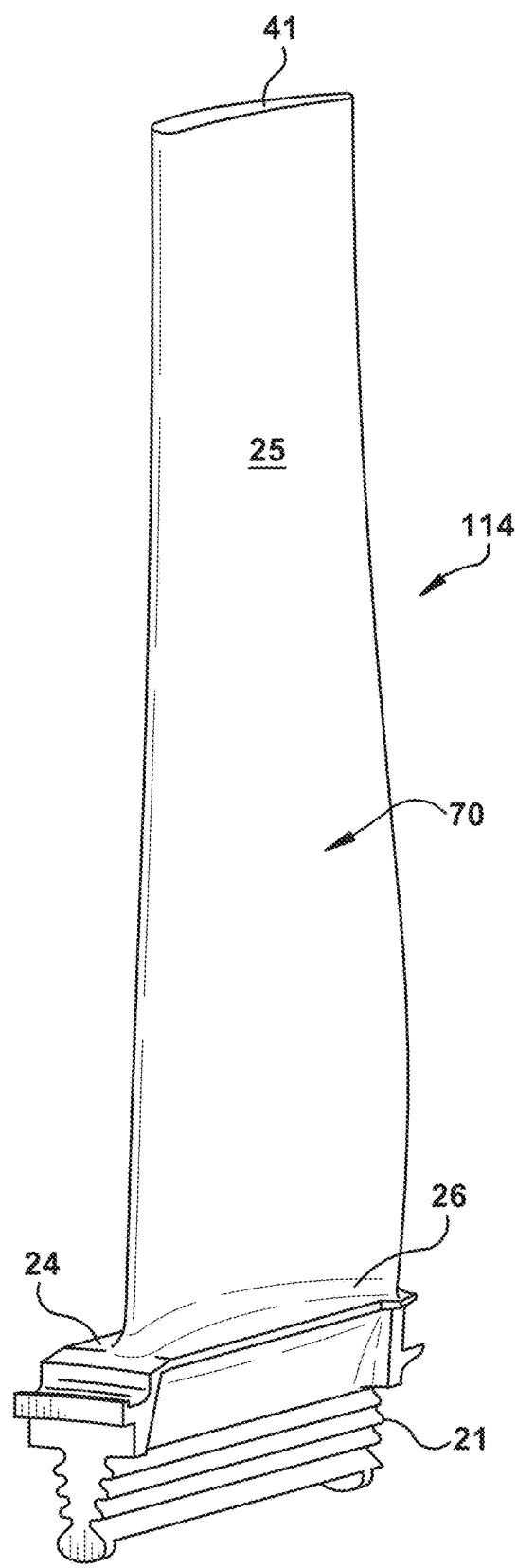
FIG. 6 illustrates an illustrative blade with a full-blade damping coating in accordance with aspects of the disclosure.

FIG. 6 illustrates layered coating 70 on a blade 114 extending the entire airfoil 25 from tip 41 towards the platform 24. Moreover, layered coating 70 can extend from tip 41 onto platform 24 for further enhanced damping effect. In this aspect of the disclosure, layered coating 70 can overlie fillet 26 that is formed at an intersection of airfoil 25 at platform 24, again affording further damping of blade 114.

Figure 7:
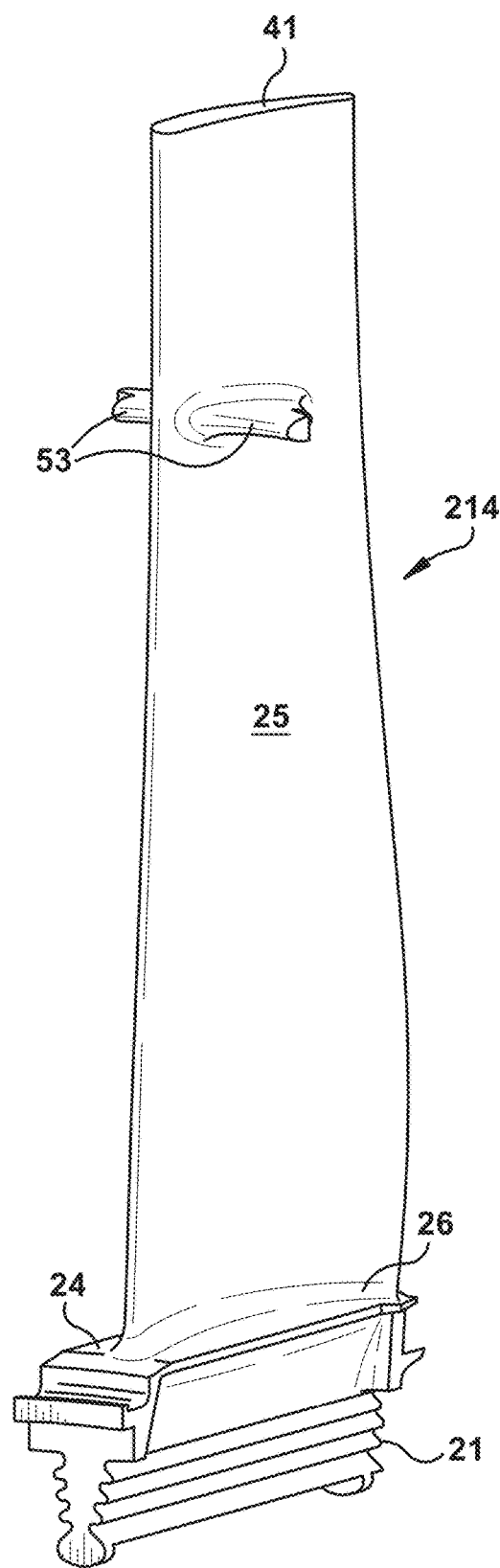
FIG. 7 illustrates an illustrative blade with part-span shrouds with a full-blade damping coating in accordance with aspects of the disclosure.

FIG. 7 illustrates layered coating 70 on a blade 214 extending the entire airfoil 25 from tip 41 towards platform 24. Moreover, layered coating 70 can extend from tip 41 of airfoil 25 onto platform 24 for further enhanced damping effect. In this aspect of the disclosure, layered coating 70 can overlie, and be applied to part span shrouds 53 to provide enhanced damping effect at those locations. Further, layered coating 70 can overlie fillet 26 that is formed at an intersection of airfoil 25 at platform 24, again affording further damping of blade 214.

It will be understood that FIGS. 1-7 show illustrative configurations of blade 114, 214. As embodied by the disclosure, any blade can be provided with layered coating 70, as described herein. For example, and not intended to limit the embodiments, a blade as embodied herein can include a blade with a top shroud, a blade with multiple part-span shrouds, blades that are solid, blades that include cooling passages, blades for steam turbines, blades for gas turbines, blades for compressors, blades that are driven by various motive forces, or any blade configuration, now known or hereinafter developed.

Figure 8:
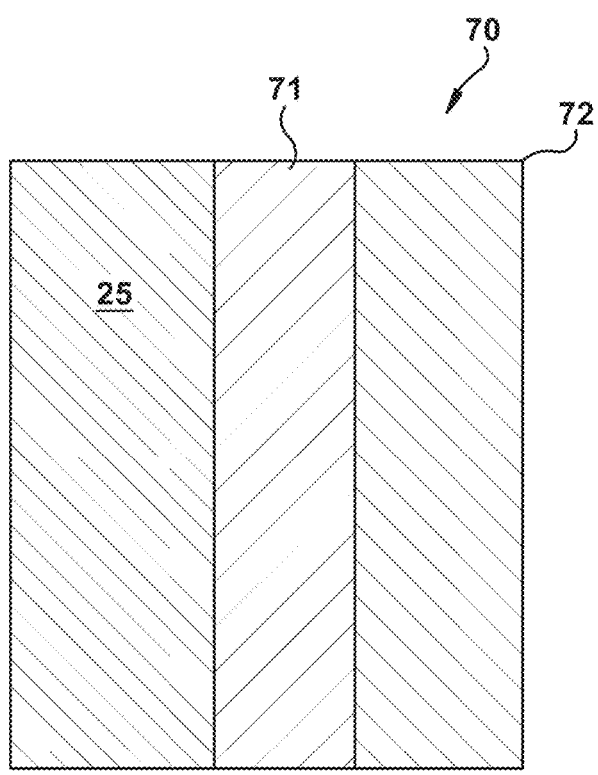
FIG. 8 illustrates a schematic representation of a damping coating in accordance with aspects of the disclosure.
Figure 9:
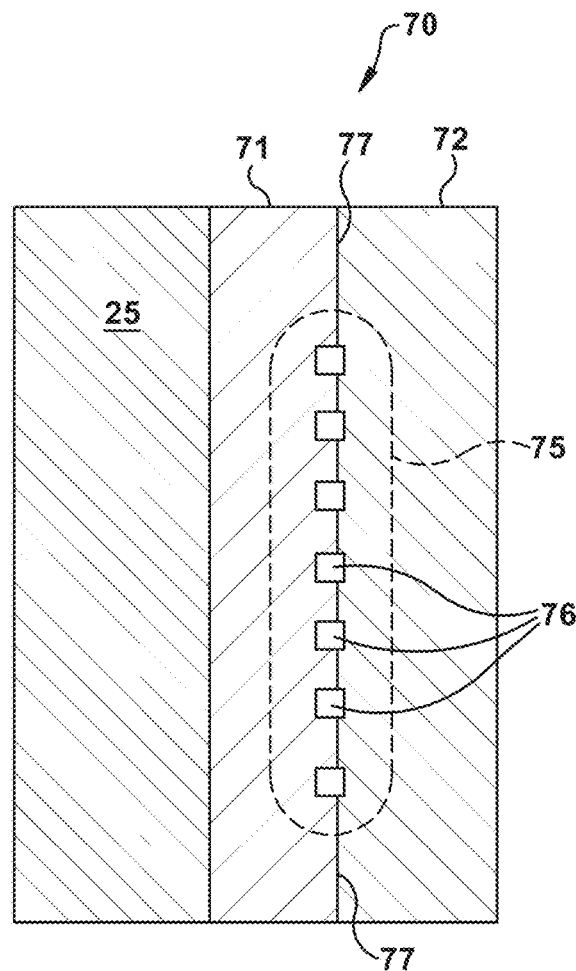
FIG. 9 illustrates a schematic representation of a partially bonded damping coating in accordance with aspects of the disclosure and FIG. 10 illustrates a schematic representation of a partially bonded damping coating with particles in cavities in accordance with aspects of the disclosure.

FIGS. 8 and 9 illustrate layered coating 70. Layered coating 70 includes a viscoelastic layer 71 applied to base material of layered damping coating 70, here airfoil 25 of turbine blade 114, 214. A constraint layer 72 is applied onto viscoelastic layer 71. Constraint layer 72 is coextensively and conterminously applied onto viscoelastic layer viscoelastic layer viscoelastic layer viscoelastic layer 71 when applied to blade 114, 214. Constraint layer 72 can be fully bonded to viscoelastic layer 71 or partially bonded to viscoelastic layer viscoelastic layer 71, as described hereinafter. Moreover, friction at interface 77 between viscoelastic layer 71 and constraint layer 72 acts to dampen and dissipate kinetic energy during blade vibration, excitation, and/or load.

Viscoelastic layer 71 can include viscoelastic material, such as being formed entirely of viscoelastic material or partially of viscoelastic material. Viscoelastic material can include but is not limited to one or more ceramic and/or high-temperature superalloy(s). The superalloy may be the material of airfoil 25. Viscoelasticity is the property of materials that exhibit both viscous and elastic characteristics when undergoing deformation. Viscous materials resist shear flow and strain linearly with time when a stress is applied. Elastic materials strain when stretched and immediately return to their original state once the stress is removed. Viscoelastic materials exhibit an ability to creep, recover, undergo stress relaxation and absorb energy. Some examples of viscoelastic materials include amorphous polymers, semicrystalline polymers, biopolymers, metals at very high temperatures, and bitumen materials.

The constraint layer 72 can include a Pre-sintered Preforms (PSP), such as a PSP including superalloy constituents. Constraint layer 72 is preferably a thin hard metal layer, such as a Pre-sintered Preform, which enhances energy dispensation of the viscoelastic layer viscoelastic layer 71. Preforms can be cut from a sintered plate, connected to a component (for example but not limited to by welding), and vacuum brazed thereto. Pre-sintered Preforms are a sintered powder metallurgy product including a homogeneous mixture of a superalloy base material and braze alloy powders. PSP braze materials may include a superalloy, such as but not limited to, an iron-based superalloy, a nickel-based superalloy or a cobalt-based superalloy. In some examples, PSP braze materials may include at least one of Aluminum (Al), Titanium (Ti), Chromium (Cr), Tungsten (W), Molybdenum (Mo), Rhenium (Re), Tantalum (Ta), Silicon (Si), Boron (B), or Iron (Fe), in addition to the base metal. Minimal post-braze grinding or machining is needed with PSP components.

Because the PSP braze materials may possess mechanical and chemical properties (e.g., mechanical strength and high temperature oxidation resistance) that make braze alloys suitable for use in high temperature oxidative environments, PSP braze materials may facilitate manufacture of articles for high temperature mechanical systems in turbine components, which are then joined using the PSP braze materials. PSP braze materials, as embodied herein, may be easier to position in blade regions and result in a more uniform braze joint.

Constraint layer 72, as embodied by the disclosure, acts as a retaining shell and is applied over the viscoelastic layer 71 that is applied over base material, airfoil 25 of turbine blade 114, 214. As discussed above, layered coating 70 can be applied to a partial surface of the base material, airfoil 25 (FIGS. 4 and 5) or alternatively to the entire surface of base material, airfoil 25 (noting FIGS. 6 and 7).

A further aspect of the disclosure is illustrated in FIG. 9. Enhanced damping may be enabled by forming a zone of partial debonding zone 75, at interface 77 of the viscoelastic layer viscoelastic layer 71 and constraint layer 72. Partial debonding zone 75 can be made with insertion of at least one and preferably a plurality of artificial defect 76 during application of the layers. Defects 76 enable increased and enhanced vibration and frictional interaction between the viscoelastic layer as it is partially bonded to the constraint layer, and thus enhanced dissipation of vibrational/kinetic energy at the interface 77. Artificial defect 76 can be formed in any shape or configuration, and although illustrated as a rectangle that is merely illustrative and not limiting of the embodiments, any polygonal configuration is within the scope of the embodiments.

Figure 10:
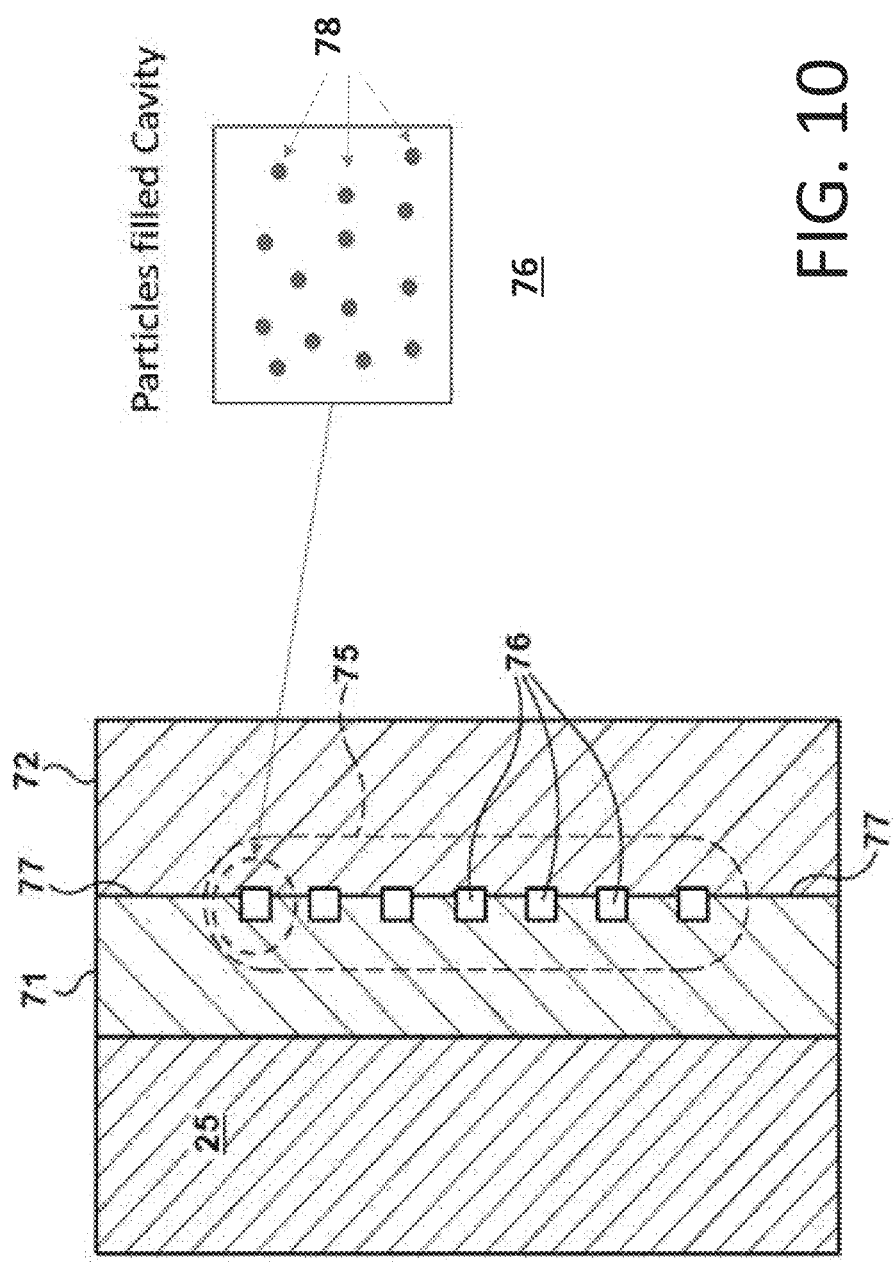

In a further aspect of the embodiments, artificial defects 76 can be cavities filled with small particles 78, as illustrated in FIG. 10. Particles 78 can include particles 78 of any shape, composition, configuration, or materials known now or hereinafter developed. Particles 78 can include any materials including but not limited to materials that form viscoelastic layer 71, constraint layer 72, and base material 25. As blade vibrates, blade kinetic energy can be dissipated as particles 78 impact each other and with the artificial defect 76 wall as well.

For example, if viscoelastic layer 71 is applied via an appropriate coating process (such as but not limited to plasma spraying, electron beam physical deposition, chemical vapor deposition, or any other appropriate coating process now know or hereinafter developed) defects 76 can be purposely introduced and formed by the coating process. For example, if viscoelastic layer 71 is sprayed, voids as defects 76 may be inherent with particular coating controls, and these defects 76 would be advantageously left for the partial debonding as described herein. Alternatively, defects 76 may be added to viscoelastic layer 71 during coating application of viscoelastic layer 71 as some defects 76 in viscoelastic layer 71 will get disposed at interface 77, and thus be able to provide the desired partial debonding at the interface 7. As a further alternative, defects 76 can be added via a separate spray step, with the defects 76 disposed at interface 77.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A coating, the coating applied to a base material, the coating comprising:
    a viscoelastic layer having a surface in which cavities are formed; and
    a constraint layer;
    wherein the viscoelastic layer is disposed on the base material, and the constraint layer is disposed on and partially bonded at a partially bonded interface, to the viscoelastic layer over the surface in which the cavities are formed; and
    wherein the cavities are filled with particles configured for vibration and frictional interaction at the partially bonded interface between the partially bonded viscoelastic layer and the constraint layer.

2. The coating according to claim 1, wherein the viscoelastic layer and the constraint layer are coextensive and conterminous on the base material.

3. The coating according to claim 1, wherein the base material is a turbine blade including an airfoil extending from a base to a tip opposite the base; and wherein the coating extends at least partially on the airfoil from the tip towards the base.

4. The coating according to claim 3, wherein the turbine blade includes at least one part-span shroud on the airfoil, wherein the coating extends from the tip at least towards the at least one part-span shroud.

5. The coating according to claim 4, wherein the at least one part-span shroud on the airfoil includes the coating.

6. The coating according to claim 3, wherein the coating extends fully on the airfoil from the tip to the base.

7. The coating according to claim 6, wherein a fillet connects the airfoil to the base, and the coating is applied to the fillet and the base.

8. The coating according to claim 1, wherein the constraint layer includes a pre-sintered preform (PSP).

9. A turbine blade, the turbine blade comprising:
    a base material;
    a coating applied to the base material, wherein the coating includes:
        a viscoelastic layer having a surface in which cavities are formed; and
        a constraint layer;
    wherein the viscoelastic layer is disposed on the base material, and the constraint layer is disposed on and partially bonded at a partially bonded interface, to the viscoelastic layer over the surface in which the cavities are formed; and
    wherein the cavities are filled with particles configured for vibration and frictional interaction at the partially bonded interface between the partially bonded viscoelastic layer and the constraint layer.

10. The turbine blade according to claim 9, wherein the viscoelastic layer and the constraint layer join at the partially bonded interface therebetween, the viscoelastic layer and the constraint layer are coextensive and conterminous on the base material.

11. The turbine blade according to claim 9, wherein the turbine blade includes an airfoil having a base, a tip opposite the base, and at least one part span shroud on the airfoil between the base and the tip, wherein the coating extends from the tip at least towards to the at least one part span shroud.

* * * * *